US011802226B2

(12) United States Patent
Mai et al.

(10) Patent No.: US 11,802,226 B2
(45) Date of Patent: Oct. 31, 2023

(54) POLYURETHANE ADHESIVE FILM

(71) Applicant: H.B. FULLER COMPANY, St. Paul, MN (US)

(72) Inventors: Felix D. Mai, Ludwigshafen (DE); Brian W. Carlson, Woodbury, MN (US)

(73) Assignee: H.B. Fuller Company, St. Paul, MN (US)

( * ) Notice: Subject to any disclaimer, the term of this patent is extended or adjusted under 35 U.S.C. 154(b) by 2635 days.

(21) Appl. No.: 14/447,197

(22) Filed: Jul. 30, 2014

(65) Prior Publication Data

US 2015/0037555 A1 Feb. 5, 2015

Related U.S. Application Data

(60) Provisional application No. 61/860,006, filed on Jul. 30, 2013.

(51) Int. Cl.
| | | |
|---|---|---|
| *C09J 175/04* | (2006.01) |
| *B32B 37/02* | (2006.01) |
| *C08G 18/02* | (2006.01) |
| *C08G 18/42* | (2006.01) |
| *C08G 18/70* | (2006.01) |
| *C09J 175/06* | (2006.01) |
| *C08G 18/80* | (2006.01) |
| *C08G 18/79* | (2006.01) |
| *C08G 18/08* | (2006.01) |
| *B32B 27/06* | (2006.01) |
| *B32B 15/04* | (2006.01) |
| *B32B 5/24* | (2006.01) |
| *B32B 27/40* | (2006.01) |
| *B32B 21/04* | (2006.01) |
| *B32B 7/12* | (2006.01) |
| *B32B 37/06* | (2006.01) |
| *B32B 37/10* | (2006.01) |
| *B32B 37/12* | (2006.01) |
| *B32B 37/18* | (2006.01) |

(52) U.S. Cl.
CPC ............ *C09J 175/04* (2013.01); *B32B 5/24* (2013.01); *B32B 7/12* (2013.01); *B32B 15/04* (2013.01); *B32B 21/04* (2013.01); *B32B 27/06* (2013.01); *B32B 27/40* (2013.01); *B32B 37/02* (2013.01); *B32B 37/06* (2013.01); *B32B 37/10* (2013.01); *B32B 37/1207* (2013.01); *B32B 37/182* (2013.01); *C08G 18/022* (2013.01); *C08G 18/0819* (2013.01); *C08G 18/4236* (2013.01); *C08G 18/4238* (2013.01); *C08G 18/706* (2013.01); *C08G 18/792* (2013.01); *C08G 18/8038* (2013.01); *C09J 175/06* (2013.01); *B32B 2250/02* (2013.01); *B32B 2255/26* (2013.01); *B32B 2305/74* (2013.01); *B32B 2307/546* (2013.01); *B32B 2375/00* (2013.01); *C08G 2170/80* (2013.01); *Y10T 428/24983* (2015.01); *Y10T 428/269* (2015.01); *Y10T 428/2896* (2015.01)

(58) Field of Classification Search
CPC ............ C09J 175/04; B32B 5/24; B32B 7/12
See application file for complete search history.

(56) References Cited

U.S. PATENT DOCUMENTS

| | | | |
|---|---|---|---|
| 5,143,987 A | 9/1992 | Hansel et al. | |
| 5,470,899 A | 11/1995 | Gulbins et al. | |
| 5,492,961 A | 2/1996 | Brock et al. | |
| 5,608,000 A | 3/1997 | Duan et al. | |
| 5,610,232 A | 3/1997 | Duan et al. | |
| 5,654,391 A | 8/1997 | Göbel et al. | |
| 5,703,158 A | 12/1997 | Duan et al. | |
| 5,710,215 A † | 1/1998 | Abend | |
| 6,017,998 A | 1/2000 | Duan et al. | |
| 6,093,270 A * | 7/2000 | Ferencz ................. C09J 175/04 156/73.5 |
| 6,194,523 B1 * | 2/2001 | Murata .............. C08G 18/4263 525/438 |
| 6,348,548 B1 * | 2/2002 | Abend ............... C08G 18/5024 524/507 |
| 6,593,435 B2 † | 7/2003 | Abend | |
| 6,686,415 B1 | 2/2004 | Abend | |
| 6,797,764 B2 | 9/2004 | Sagiv et al. | |
| 7,498,380 B2 | 3/2009 | Ganster et al. | |
| 2002/0022680 A1 | 11/2002 | Guse et al. | |
| 2002/0164486 A1 * | 11/2002 | Guse ................... C09D 175/06 428/423.1 |
| 2003/0100626 A1 | 5/2003 | Sapper et al. | |
| 2003/0157337 A1 | 8/2003 | Abend | |

(Continued)

FOREIGN PATENT DOCUMENTS

| | | |
|---|---|---|
| CA | 2355908 | 6/2000 |
| GB | 2400104 | 6/2014 |

(Continued)

OTHER PUBLICATIONS

Enthalpy of Fusion, https://en.wikipedia.org/wiki/Enthalpy_of_fusion (Year: 2019).*
Enthalpy of Fusion of Polyurethane, M.S Sanchez-Adsuar, International Journal of Adhesion and Adhesives, vol. 20, Issue 4, 2000, pp. 291-298 (Year: 2000).*
Bayer Materialscience Brochure, The Chemistry of Polyurethane Coatings, Aug. 2005. USA.

(Continued)

*Primary Examiner* — Alicia Chevalier
*Assistant Examiner* — Thomas A Mangohig
(74) *Attorney, Agent, or Firm* — Allison Johnson; Kirsten Stone

(57) ABSTRACT

A thin self-supporting adhesive film is claimed that includes a first polyurethane and a solid surface-deactivated isocyanate.

26 Claims, No Drawings

(56) References Cited

U.S. PATENT DOCUMENTS

| | | |
|---|---|---|
| 2004/0204520 A1 | 10/2004 | Bell et al. |
| 2005/0288430 A1 | 12/2005 | Gindin et al. |
| 2008/0171208 A1 | 7/2008 | Buchner et al. |
| 2008/0262131 A1 | 10/2008 | Linnenbrink et al. |
| 2009/0123757 A1 | 5/2009 | Pudleiner et al. |
| 2009/0227724 A1 | 9/2009 | Ganster et al. |
| 2009/0240005 A1 | 9/2009 | Kraus et al. |
| 2010/0104831 A1* | 4/2010 | Kanagawa ......... C08G 18/4255 428/198 |
| 2010/0193591 A1 | 8/2010 | Rancien et al. |
| 2011/0244228 A1 | 10/2011 | Blum et al. |
| 2011/0306724 A1* | 12/2011 | Campbell .......... C08G 18/0823 524/591 |
| 2012/0012251 A1 | 1/2012 | Burckhardt et al. |
| 2012/0015193 A1* | 1/2012 | Hartz ..................... B32B 21/08 428/425.1 |
| 2012/0021196 A1 | 1/2012 | Kenney |
| 2012/0112133 A1† | 5/2012 | Bahnmuller |
| 2012/0171459 A1 | 7/2012 | Herbert |
| 2012/0225302 A1 | 9/2012 | Buchner et al. |
| 2013/0273375 A1* | 10/2013 | Achten ............... C08F 283/006 428/423.1 |
| 2015/0017452 A1† | 1/2015 | Schmitz-Stapela |

FOREIGN PATENT DOCUMENTS

| | | |
|---|---|---|
| WO | WO 2012/069587 | 5/2012 |
| WO | WO2012092620 | 7/2012 |

OTHER PUBLICATIONS

Bayer Materialscience Brochure, Dispercol® Polyurethane Dispersions as Adhesive Raw Materials. USA.

Bayer Material Science AG, "Dispercoll U Sticks. When you Want it To," product literature, Apr. 2004, pp. 1-7, Bayer Material Science AG, Leverkusen, Germany.

* cited by examiner
† cited by third party

POLYURETHANE ADHESIVE FILM

CROSS-REFERENCE TO RELATED APPLICATIONS

This application claims the benefit of U.S. Provisional Application No. 61/860,006, filed Jul. 30, 2013, and incorporated herein.

BACKGROUND

Adhesives are often used to bond substrates together so as to maintain the two substrates in a fixed relation to each other.

Adhesives based on polyurethane dispersions (PUDs) can be formulated with solid surface-deactivated isocyanates. Such compositions can be preapplied to a substrate and dried such that the isocyanate is not yet activated (i.e. the heat is kept at less than that needed for activation and curing). This gives the user the option of activating the isocyanate with heat at a later date to form a bond and initiate the curing reaction between the polyurethane and isocyanate.

In a production environment, it would be convenient if the adhesive could be supplied as a thin self supporting adhesive film to the end user. The end user would then not have to contend with the equipment and the process of applying and drying the adhesive.

SUMMARY

In one aspect, the invention features a self-supporting adhesive film including a solid surface-deactivated isocyanate and greater than 70% by weight of a first polyurethane, said first polyurethane having a weight average Molecular Weight (Mw) of no greater than about 90,000 and an enthalpy of fusion of at least about 25 J/g.

In one embodiment, the self-supporting adhesive film is obtained from an aqueous composition. In another embodiment, the solid surface-deactivated isocyanate is derived from toluene diisocyanate. In still another embodiment, the film of said first polyurethane has an enthalpy of fusion of at least about 35 J/g.

In one embodiment, the first polyurethane is derived from a polyester derived from a polyol selected from the group consisting of 1,4-butane diol and 1,6-hexane diol. In a second embodiment, the first polyurethane is derived from a polyester derived from adipic acid and a mixture of 1,6-hexane diol and neopentyl glycol; and an aliphatic isocyanate.

In a different embodiment, the film exhibits a bond strength of at least about 20 N/2.5 cm when tested according to the Bond Test Method at a Bond Line Temperature of about 64° C. In another embodiment, the film exhibits a bond strength of at least about 30 N/2.5 cm when tested according to the Bond Test Method at a Bond Line Temperature of about 82° C.

In some embodiments, the self-supporting adhesive film has a thickness of from about 1 mil to about 8 mils. In other embodiments, the self-supporting adhesive film further includes a release liner.

In other embodiments, the self-supporting adhesive film additionally includes a second polymer. In one embodiment, the sum of the solid surface-deactivated isocyanate, the first polyurethane and the second polymer amounts to at least about 95% by weight of the self-supporting adhesive film.

In another aspect, the invention includes a composite structure including a first layer and a second layer, at least one of the first layer and said second layer including the self-supporting adhesive film, where the self-supporting adhesive film includes a solid surface-deactivated isocyanate and greater than 70% by weight of a first polyurethane, said first polyurethane having a weight average Molecular Weight (Mw) of no greater than about 90,000 and an enthalpy of fusion of at least about 25 J/g.

In an embodiment, the first layer comprises the self-supporting adhesive film and the second layer is flexible and is selected from the group consisting of fabric, foil, and paper.

In another aspect, the invention features a composite structure including the self-supporting adhesive film, a rigid layer, and a flexible layer, the rigid layer being bonded to the flexible layer through the self-supporting adhesive film. In some embodiments, the rigid layer comprises at least one of metal, metal composite, plastic, plastic composite, wood, and wood-composite. In other embodiments, the flexible layer comprises at least one of fabric, foil and paper. In still other embodiments, the rigid layer is nylon and the soft fabric layer is microfiber.

In another aspect, the invention features a method of making a composite including contacting a flexible layer with a first major surface of the self-supporting adhesive film, applying heat to the film before or after the film is applied to the flexible substrate; contacting a rigid layer with a second major surface of the self-supporting adhesive film such that the second major surface is in direct contact with the rigid layer to form a composite; and applying heat and pressure to the composite.

In a different aspect, the self-supporting adhesive film is obtained from an aqueous composition, said aqueous composition including a solid surface-deactivated isocyanate and a first polyurethane dispersion, the dried film of which has an enthalpy of fusion of at least about 25 J/g, the self-supporting adhesive film having a thickness of from about 1 mil to about 8 mils. In one embodiment, the isocyanate is derived from an aromatic isocyanate. In a different embodiment, the self-supporting adhesive film has a thickness of from about 2 mils to about 6 mils. In another embodiment, a composite structure is obtained including the self-supporting adhesive film, a first rigid layer and a second rigid layer, the rigid layers being bonded to each other through the self-supporting adhesive film. In still another embodiment, the composite structure includes the self-supporting adhesive film, a rigid layer, and a flexible layer, the rigid layer being bonded to the flexible layer through the self-supporting adhesive film. The self-supporting adhesive film alternately includes a second polymer.

Glossary

A self supporting adhesive film is an adhesive film absent any substrate.

A substrate is the end material the adhesive is used to bond or coat. A release liner is not considered a substrate.

DETAILED DESCRIPTION

The inventors have discovered an adhesive composition that can be supplied to the user as a self-supporting adhesive film with or without a release liner.

The film includes an isocyanate reactive polymer and a solid surface-deactivated isocyanate. The isocyanate reactive polymer is a polyurethane. For purposes of this application, the word polyurethane includes polyurethanes, polyureas and polyurethane ureas.

Applicants have discovered that a thin layer of the self-supporting adhesive film is able to form a strong initial bond with a low bond line temperature. This minimizes the time needed to make an individual part and increases the speed of manufacture on a production line.

The self-supporting adhesive film exhibits a bond strength of at least about 20 N/2.5 cm, at least about 30 N/2.5 cms, at least about 50 N/2.5 cms, or even from about 15 N/2.5 cm to about 90 N/2.5 cm, when tested according to the Bond Test Method.

Aqueous Composition

The self-supporting adhesive film can be derived from an aqueous composition that includes a first polymer comprising a first polyurethane dispersion and a solid surface-deactivated isocyanate crosslinking agent. The first polyurethane dispersion and the solid surface-deactivated isocyanate crosslinking agent can be supplied separately as a two part system, and then blended prior to formation of the film or alternately can be supplied as a one part system where the two are already blended.

First Polyurethane Dispersion

Useful first polyurethane dispersions include anionic polyurethane dispersions. The first polyurethane has a degree of crystallinity and a melting peak sufficiently low to enable easy activation. One useful indication of crystallinity is enthalpy of fusion—the higher the enthalpy of fusion of a compound, the higher its crystallinity. One useful method of determining the enthalpy of fusion ($\Delta H$) and melting peak of polyurethane utilizes Differential Scanning Calorimetry (DSC) conducted at a heating rate of 10° C./minute using a PYRIS 1 DSC.

The dried first polyurethane preferably has an enthalpy of fusion of at least about 15 Joules per gram (J/g), at least about 25 J/g, at least about 35 J/g, or even from about 15 J/g to about 70 J/g. The dried first polyurethane preferably has a melting peak of no greater than about 65° C., no greater than about 60° C., or even no greater than about 55° C.

The first polyurethane has a relatively low weight average molecular weight (Mw). Preferably, the first polyurethane has a molecular weight of no greater than about 90,000, no greater than about 85,000, or even no greater than about 80,000.

The first polyurethane is derived from at least one diol, a polyol, or a combination thereof, and at least one di- and or polyisocyanate.

Examples of useful polyols include polyester polyols derived in part from an aliphatic diol, useful examples of which include ethylene glycol, 1,3-propanediol, 1,4-butanediol, 1,5-pentanediol, 1,6-hexanediol and neopentyl glycol. In an embodiment, the first polyurethane is derived in part from a polyester polyol derived in part from 1,4-butanediol or 1,6-hexanediol.

Other useful polyester polyols are derived from linear dicarboxylic acids and/or derivatives thereof (e.g., anhydrides, esters and acid chlorides), and aliphatic, cyclo aliphatic, linear, and branched polyols, and combinations thereof. In an embodiment, the first polyurethane is derived from a polyester polyol derived from a dicarboxylic acid selected from the group comprising adipic acid, succinic acid, sebacic acid, and dodecanedioic diacid.

In another embodiment, the first polyurethane is derived from a polyester polyol based on adipic acid and 1,4-butanediol or a polyester polyol based on adipic acid and 1,6-hexanediol or a polyester polyol based on adipic acid and a mixture of 1,6-hexanediol and neopentyl glycol.

Useful di- and poly-isocyanates include, e.g., any organic compound that has at least two free isocyanate groups in each molecule. Preferred diisocyanates include, e.g., aliphatic diisocyanates (e.g. hexamethylene diisocyanate (HDI), 1-isocyanto-3,3,5-trimethyl-5-isocyanatomethyl-cyclohexane (IPDI)), and combinations thereof.

The first polyurethane can be present as one polyurethane or as a blend of two or more different polyurethanes.

The dried self-supporting adhesive film includes at least about 30% by weight, at least about 50% by weight, at least about 70% by weight, at least about 80% by weight, from about 30% by weight to about 97% by weight first polyurethane, or even from about 50% by weight to about 95% by weight first polyurethane.

Useful commercially available first polyurethane dispersions include, e.g., DISPERCOLL U XP 2682, DISPERCOLL U 56 and DISPERCOLL U 2815 XP all of which are available from Bayer Material Science AG in Germany, and WD4047, which is available from HB Fuller Company (St. Paul, MN).

Solid Surface-Deactivated Isocyanate Crosslinking Agent

The aqueous composition includes a solid surface-deactivated isocyanate crosslinking agent. Useful solid surface-deactivated isocyanate crosslinking agents are derived from a polyisocyanate and a deactiving agent. A variety of polyisocyanates are suitable including, e.g., aliphatic, cycloaliphatic, heterocyclic, and aromatic polyisocyanates (e.g. methylene diphenyl diisocyanate (MDI), toluene diisocyanate (TDI)), and isophorone diisocyanate (IPDI)), and those polyisocyanates disclosed in, e.g., U.S. Pat. No. 6,348,548 B1, which is incorporated herein by reference. Surface deactivated isocyanates derived from aromatic isocyanates are preferred as they react faster than aliphatic isocyanates enabling the formation of a strong initial bond at a low bond line temperature.

A variety of deactiving agents are suitable including, e.g., primary and secondary aliphatic amines, diamines, polyamines, hydrazine derivatives, amidines, guanidines and combinations thereof. Useful examples of deactivating agents include ethylene diamine, 1,3-propylene-diamine, diethylene triamine, triethylene tetramine, 2,5-dimethyl-piperazine, 3,3'-dimethyl-4,4'-diamino-dicyloheyl, methane, methyl nonane-diamine, isophoron diamine, 4,4'-diaminodicyclohexyl methane, diamino and triamino polypropylene ether, polyamido amine, and combinations thereof, as well as those deactivating agents disclosed in U.S. Pat. No. 6,348,548 B1.

Useful solid surface-deactivated isocyanate crosslinking agents can be prepared in a variety of ways including those processes described in U.S. Pat. No. 6,348,548 B1.

The solid surface-deactivated isocyanate crosslinking agent can be in a variety of forms including, e.g., aqueous suspensions and micronized particles.

Useful commercially available solid surface-deactivated isocyanates include, e.g., DISPERCOLL BL XP 2514 aqueous suspension of latent-reactive isocyanate containing approximately 40% TDI dimer. Useful solid particle isocyanates that are capable of being deactivated include DISPERCOLL LP BUEJ 471, a 100% solids micronized IPDI-isocyanurate available from Bayer Material Science AG in Germany and ADDOLINK TT and ADDOLINK ST available from Rhein Chemie Rheinau GmBH in Mannheim, Germany.

The solid surface-deactivated isocyanate can be blended with the first polyurethane dispersion to form a stable aqueous composition.

Additional Components

The aqueous composition optionally includes a second polymer. Some examples of possible second polymers include e.g. a second polyurethane (e.g. DISPERCOLL U 53 commercially available from Bayer Material Science AG in Germany), VAE (vinyl acetate ethylene), PVA (poly vinyl alcohol), acrylics, butadiene acrylonitrile and styrene butadiene rubber (SBR).

The aqueous composition optionally includes a variety of other additives including, e.g., catalysts (e.g. amine based), preservatives, pH modifiers (e.g. aqueous ammonia), adhesion promoters (e.g. tackifers, silane containing compounds), color agents, surfactants, defoaming agents, fungicides, bactericides, thickening agents, blocking agents and stabilizers (e.g. amines), fillers (e.g. carbonates, talc, starch), materials to help the adhesive film form a barrier (e.g. nano clay), insulative materials (e.g. mineral fillers, glass microbubbles), conductive materials (e.g. various metals (e.g. silver)) and combinations thereof.

A useful stabilizer is JEFFAMINE T-403 POLYETHERAMINE commercially available from Huntsman Corporation (The Woodlands, Texas). Useful thickeners for the aqueous dispersion include BORCHI®GEL A LA available from OMG Borchers GmbH (Langenfeld, Germany) and STEROCOLL HT commercially available from BASF Chemical Company (Ludwigshafen, Germany). A useful preservative is ACTICIDE MBS commercially available from Thor GmbH (Speyer, Germany).

Self-Supporting Adhesive Film

The aqueous composition is dried into a self-supporting adhesive film. The film can be formed from the aqueous composition using a variety of methods including, e.g., spraying (e.g. spiral, splatter, etc.) and by various coating techniques (e.g. roll, slot, gravure, pattern, etc.)

In one method, the aqueous composition is roll coated at the desired coat weight onto a release liner. The aqueous composition is then passed through a drying tunnel. The drying temperature in the tunnel can be varied, but preferably is maintained at a temperature that is low enough to prevent the solid surface-deactivated isocyanate from activating. The temperature of the adhesive film during drying preferably is maintained at a temperature of less than about 70° C., less than about 60° C., or even less than about 55° C. After the drying tunnel, the adhesive coated on the release liner optionally can be chilled e.g. passed over a chilled roller. It can then be wound upon itself as in, e.g., a roll, and stored for a later date.

The self-supporting adhesive film can include a solid surface-deactivated isocyanate and greater than 70% by weight of a first polyurethane, said first polyurethane having a weight average Molecular Weight (Mw) of no greater than about 90,000 and an enthalpy of fusion of at least about 25 J/g. Alternately, the self-supporting adhesive film can include a solid surface-deactivated isocyanate and greater than 70% by weight of a first polyurethane, said first polyurethane having a weight average Molecular Weight (Mw) of no greater than about 90,000 and an enthalpy of fusion of at least about 25 J/g and a second polymer. The sum of the solid surface-deactivated isocyanate, the first polyurethane and the second polymer can amount to at least about 90% by weight, at least about 95% by weight, or even at least about 98% of the self-supporting adhesive film.

The dried film has a thickness of less than about 20 mils, less than about 15 mils, less than about 10 mils, less than about 8 mils, less than about 6 mils, from about 1 mil to about 8 mils, or even from about 2 mils to about 6 mils. The thickness of the film can be obtained in any number of ways e.g. by direct coating, by multiple passes through a coater, or by laminating two different thickness films together.

The film can form a strong bond between two different substrates. The substrates can be in layers. The strong bond can be obtained with a bond line temperature (i.e. the temperature of the bond as it is formed) of no greater than about 90° C., no greater than about 80° C., no greater than about 70° C. or even from about 50° C. to about 90° C.

Composite Structure

The self-supporting adhesive film can be used to form a composite structure. The composite structure includes the adhesive film and at least one additional layer (e.g., substrate). The layer can be rigid or flexible. The adhesive film can be placed over the top of, so as to cover at least one surface of the layer.

Examples of useful rigid layers include tiles, ceramics, metals (e.g. aluminum, stainless steel), plastics (e.g. polyethylene, polypropylene, polyamides (e.g. nylon), polyurethanes, polycarbonate, acrylonitrile-butadiene-styrene (ABS), ABS/polycarbonate blends, polyether ether ketone (PEEK), etc.), plastic composites (e.g. fiber reinforced plastics), glass, cardboard, wood and wood-containing products. The rigid layer can include one layer or it can be multilayered (i.e. including at least two layers).

The rigid layer can be pre-treated to improve adhesion of the self-supporting adhesive film. It can be pre-treated in any number of ways, including (e.g. corona, plasma, flame, by various chemical primers, and combinations thereof).

Examples of useful flexible layers include various textiles (e.g. fabrics (e.g. microfiber based polyethylene, cotton, canvas and nonwovens), artificial leathers and furs, foils (e.g. decorated foils), papers, films (e.g. plastic films (e.g. polyester, polyimide (i.e. Kapton), polypropylene and polyethylene)) and combinations thereof.

The self-supporting adhesive film can alternately be used to form a composite structure including a rigid layer and a flexible layer, where the self-supporting adhesive film layer is positioned between the rigid layer and the soft layer so as to adhere the two layers together.

The self-supporting adhesive film can further be used to form a composite structure selected from a group consisting of two rigid layers and two flexible layers. The self-supporting adhesive film layer is positioned between the two layers so as to adhere the two layers together. The two rigid layers/two flexible layers composite can include the same material or they may include different materials.

The composite structure can be formed by a number of different methods. In one method, a flexible layer is contacted with a first major surface of the self-supporting film and heat is applied to the film before or after the film is applied to the flexible substrate, or a combination thereof. A rigid layer is then contacted with a second major surface of the self-supporting film such that the second major surface is in direct contact with the rigid layer to form a composite. The composite can be heated to a temperature of at least about 70° C. to activate the isocyanate and begin the curing process. Alternately, the composite can be heated to a temperature just hot enough to form a bond. Pressure can be used to help form the bond (e.g. membrane or bladder press). A limited about of time is needed to form the bond.

Uses

The self-supporting adhesive film is useful in the manufacture of a variety of items including but not limited to, e.g., shoes, automobile parts, truck bed covers, textile laminations (e.g. outdoor apparel, lingerie), various assembled goods (e.g panels, laminations, filters, flooring, etc.).

EXAMPLES

Test Procedures

Test procedures used in the examples and throughout the specification, unless stated otherwise, include the following.

Molecular Weight

The GPC molecular weight distribution curve of each dried polyurethane sample was obtained using a Waters 2695 Separations Module connected to a Waters 2414 RI detector, running 0.05M LiBr/DMF mobile phase through two Agilent Resipore GPC columns. The molecular weight data was calculated versus polymethyl methacrylate standards.

Melting Peak and Enthalpy of Fusion Test Method

The melting peak and enthalpy of fusion ($\Delta H$) of the dried polyurethane dispersions was determined using Differential Scanning Calometry (DSC) at a heating rate of 10° C./minute using a PYRIS 1 DSC.

Bond Test Method

Dry films are prepared from waterborne compositions in Table 2. The films are drawn down using a 10 cm wide draw down bar with a 250 μm gap. The films are dried for 20 minutes at a temperature of 40° C. to form 100 μm (3.94 mils) thick dry films.

Bonds are then made between polycarbonate and polyurethane based fabric. The bonds were made using the specified bond line temperature with a bonding pressure of 5 N/cm² and a bonding time of 60 seconds.

Bonds are then aged for 5 minutes at room temperature and pulled apart using a ZWICK peel tester at a speed of 300 mm/minute. An average of two bonds is reported.

Commercially available polyurethane dispersions were tested according to the Melting Peak and Enthalpy of Fusion test method and according to the Molecular Weight Test Method. The results are set forth in Table 1 below.

TABLE 1

| Polyurethane Dispersion Comparison | | | | |
|---|---|---|---|---|
| | % Solids* | Delta H (J/g) | Melting peak (° C.) | Molecular Weight (Mw) |
| DISPERCOLL U 53 | 40 | 39.7 | 47.9 | 96700 |
| DISPERCOLL U 56 | 50 | 46.5 | 47.9 | 73600 |
| DISPERCOLL U XP 2682 | 50 | 41.3 | 47.8 | 73800 |

*As reported by supplier

Examples 1-4

Aqueous compositions were prepared by combining the components and in the amounts set forth in Table 2 below.

The resulting compositions were then tested according to the Bond Test Method and the results are reported in Table 2.

TABLE 2

| | Examples | | | |
|---|---|---|---|---|
| | Ex. 1 | Ex. 2 | Ex. 3 | Ex. 4 |
| DISPERCOLL U 53 | 23.68 | 27.82 | | |
| DISPERCOLL U 56 | 52.52 | 61.71 | | |
| DISPERCOLL U XP 2682 | | | 80 | 94 |
| ACTICIDE MBS | .16 | .19 | | |
| STEROCOLL HT | .546 | .643 | | |
| AMMONIA (25% solution in water as ph modifier) | .074 | .087 | | |
| DISPERCOLL BL XP 2514 (TDI) | | 6 | | 6 |
| Water | 3.02 | 3.55 | | |
| DESMODUR LP BUEJ 471-(37 wt % in Water) | 20 | | 20 | |
| Wt % of first polyurethane in dried film | 60 | 68 | 84 | 95 |
| Bond Test at a bond linetemperature of about 64° C. (N/2.5 cm) | 11.1 | 5.8 | 36.2 | 36.4 |
| Bond Test at a tool temperature of about 82° C. (N/2.5 cm) | 47.1 | 12.8 | 48.1 | 79.6 |

Other embodiments are within the claims.

What is claimed is:

1. A self-supporting adhesive film comprising:
a solid surface-deactivated isocyanate; and
greater than 70% by weight, based on the weight of the adhesive film, of a isocyanate reactive polyurethane component having a weight average molecular weight (Mw) of no greater than about 90,000 g/mol and an enthalpy of fusion of at least about 25 J/g, the polyurethane component comprising
a first polyurethane having a weight average molecular weight of no greater than about 90,000 g/mol and an enthalpy of fusion of at least about 25 J/g, and
a second polyurethane different from the first polyurethane and having a weight average molecular weight of no greater than about 90,000 g/mol and an enthalpy of fusion of at least about 25 J/g, the second polyurethane differing from the first polyurethane based on a property selected from the group consisting of composition, molecular weight, enthalpy of fusion, melting peak, and combinations thereof.

2. The self-supporting adhesive film of claim 1, wherein the self-supporting adhesive film is obtained from an aqueous composition.

3. The self-supporting adhesive film of claim 1, wherein said solid surface-deactivated isocyanate is derived from toluene diisocyanate.

4. The self-supporting adhesive film of claim 1, wherein a film of said first polyurethane has an enthalpy of fusion of at least about 35 J/g.

5. The self-supporting adhesive film of claim 1, wherein the first polyurethane is derived from a polyester derived from a polyol selected from the group consisting of 1,4-butane diol and 1,6-hexane diol.

6. The self-supporting adhesive film of claim 1, wherein the first polyurethane is derived from:
a polyester polyol derived from adipic acid, 1,6-hexane diol, and neopentyl glycol; and
an aliphatic isocyanate.

7. The self-supporting adhesive film of claim 1, wherein said film exhibits a bond strength of at least about 20 N/2.5 cm when tested according to the Bond Test Method at a Bond Line Temperature of about 64° C.

8. The self-supporting adhesive film of claim 1, wherein
the first polyurethane has an enthalpy of fusion of at least 35 J/g, and
the second polyurethane has an enthalpy of fusion of at least 35 J/g.

9. The self-supporting adhesive film of claim 1 further comprising an additional polymer, the additional polymer being different from the first polyurethane and the second polyurethane.

10. The self-supporting adhesive film of claim 9 wherein the sum of the percent by weight of the solid surface-deactivated isocyanate, the percent by weight of the polyurethane component, and the percent by weight of the additional polymer amounts to at least about 95% by weight of the self-supporting adhesive film.

11. A composite structure comprising:
a first layer; and
a second layer,
at least one of said first layer and said second layer comprising the self-supporting adhesive film of claim 1.

12. The composite structure of claim 11, wherein
the first polyurethane has an enthalpy of fusion of at least 35 J/g, and
the second polyurethane has an enthalpy of fusion of at least 35 J/g.

13. A composite structure comprising:
the self-supporting adhesive film of claim 1,
a rigid layer, and
a flexible layer, the rigid layer being bonded to the flexible layer through the self-supporting adhesive film.

14. The composite structure of claim 13, wherein the rigid layer comprises at least one of metal, metal composite, plastic, plastic composite, wood, and wood-composite.

15. The composite structure of claim 13, wherein the flexible layer comprises at least one of fabric, foil, film and paper.

16. The composite structure of claim 13, wherein the rigid layer is nylon and the flexible layer is a soft fabric comprising microfibers.

17. The composite structure of claim 13, wherein
the first polyurethane has an enthalpy of fusion of at least 35 J/g, and
the second polyurethane has an enthalpy of fusion of at least 35 J/g.

18. A method of making a composite comprising:
contacting a flexible layer with a first major surface of the self-supporting adhesive film of claim 1;
applying heat to the film before or after the film is applied to the flexible substrate;
contacting a rigid layer with a second major surface of the self-supporting adhesive film such that the second major surface is in direct contact with the rigid layer to form a composite; and
applying heat and pressure to the composite.

19. A self-supporting adhesive film obtained from an aqueous composition, said aqueous composition comprising:
a solid surface-deactivated isocyanate; and
an isocyanate reactive polyurethane dispersion, the dried film of which has an enthalpy of fusion of at least about 25 J/g, the isocyanate reactive polyurethane dispersion comprising
a first polyurethane having an enthalpy of fusion of at least about 25 J/g, and
a second polyurethane different from the first polyurethane and having an enthalpy of fusion of at least about 25 J/g, the second polyurethane differing from the first polyurethane based on a property selected from the group consisting of composition, molecular weight, enthalpy of fusion, melting peak, and combinations thereof,
the self-supporting adhesive film having a thickness of from about 1 mil to about 8 mils.

20. The self-supporting adhesive film of claim 19, wherein said film has a thickness of from about 2 mils to about 6 mils.

21. The self-supporting adhesive film of claim 19 wherein the solid surface-deactivated isocyanate is derived from an aromatic isocyanate.

22. The self-supporting adhesive film of claim 19 further comprising an additional polymer, the additional polymer being different from the first polyurethane and the second polyurethane.

23. A composite structure comprising:
the self-supporting adhesive film of claim 2,
a first rigid layer, and a
second rigid layer,
the rigid layers being bonded to each other through the self-supporting adhesive film.

24. A composite structure comprising:
the self-supporting adhesive film of claim 2,
a rigid layer, and
a flexible layer,
the rigid layer being bonded to the flexible layer through the self-supporting adhesive film.

25. A self-supporting adhesive film comprising:
a solid surface-deactivated isocyanate; and
greater than 70% by weight, based on the weight of the adhesive film, of a isocyanate reactive polyurethane component having a weight average molecular weight (Mw) of no greater than about 90,000 g/mol and an enthalpy of fusion of at least about 25 J/g, the polyurethane component comprising
a first polyurethane derived from a polyester polyol, the first polyurethane having a weight average molecular weight of no greater than about 90,000 g/mol and an enthalpy of fusion of at least about 25 J/g, and
a second polyurethane derived from a polyester polyol, the second polyurethane being different from the first polyester polyurethane and having a weight average molecular weight of no greater than about 90,000 g/mol and an enthalpy of fusion of at least about 25 J/g, the second polyurethane differing from the first polyurethane based on a property selected from the group consisting of composition, molecular weight, enthalpy of fusion, melting peak, and combinations thereof.

26. The self-supporting adhesive film of claim 25, wherein
the first polyurethane has an enthalpy of fusion of at least 35 J/g, and
the second polyurethane has an enthalpy of fusion of at least 35 J/g.

* * * * *